(12) United States Patent
Frink

(10) Patent No.: US 6,961,801 B1
(45) Date of Patent: Nov. 1, 2005

(54) METHOD AND APPARATUS FOR ACCESSING VIDEO DATA IN MEMORY ACROSS FLOW-CONTROLLED INTERCONNECTS

(75) Inventor: Craig R. Frink, Chelmsford, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 09/054,933

(22) Filed: Apr. 3, 1998

(51) Int. Cl.[7] .............................................. G06F 13/36
(52) U.S. Cl. ..................... 710/308; 710/313; 725/89; 725/92; 725/145
(58) Field of Search .................... 725/87, 89, 91, 725/92, 98, 141, 153; 345/520, 522, 530, 345/531, 547, 564, 565; 709/231, 250; 710/5, 710/305, 26, 308, 313

(56) References Cited

U.S. PATENT DOCUMENTS

| | | | |
|---|---|---|---|
| 4,991,079 A | 2/1991 | Dann | 364/200 |
| 5,045,940 A | 9/1991 | Peters et al. | 358/143 |
| 5,321,750 A * | 6/1994 | Nadan | 380/20 |
| 5,586,264 A * | 12/1996 | Belknap et al. | 395/200.08 |
| 5,604,540 A | 2/1997 | Howe | 348/405 |
| 5,644,364 A | 7/1997 | Kurtze et al. | 348/584 |
| 5,654,737 A | 8/1997 | Der et al. | 345/113 |
| 5,661,848 A * | 8/1997 | Bonke et al. | |
| 5,689,660 A | 11/1997 | Johnson et al. | 395/309 |
| 5,712,976 A * | 1/1998 | Falcon, Jr. et al. | 395/200.09 |
| 5,760,794 A * | 6/1998 | Munson et al. | |
| 5,761,417 A * | 6/1998 | Henley et al. | 395/200.09 |
| 5,799,150 A | 8/1998 | Hamilton et al. | 345/200.33 |
| 5,819,056 A * | 10/1998 | Favor | |
| 5,854,640 A * | 12/1998 | North et al. | |
| 5,884,050 A * | 3/1999 | Wheeler et al. | |
| 5,920,702 A * | 7/1999 | Bleidt et al. | |
| 5,929,836 A | 7/1999 | Der et al. | 345/113 |
| 5,987,501 A | 11/1999 | Hamilton et al. | 709/203 |
| 6,018,765 A * | 1/2000 | Durana et al. | 709/217 |
| 6,093,213 A * | 7/2000 | Favor et al. | |
| 6,105,083 A | 8/2000 | Kurtze et al. | 710/29 |
| 6,134,607 A | 10/2000 | Frink | 710/22 |
| 6,141,691 A | 10/2000 | Frink et al. | 709/233 |
| 6,198,477 B1 | 3/2001 | Kurtze et al. | 345/302 |
| 6,223,211 B1 | 4/2001 | Hamilton et al. | 709/203 |
| 6,239,815 B1 | 5/2001 | Frink et al. | |
| 6,327,253 B1 | 12/2001 | Frink | 370/260 |
| 6,357,047 B1 | 3/2002 | Kurtze et al. | 725/151 |

(Continued)

FOREIGN PATENT DOCUMENTS

EP      0 627 689 A2      12/1994

(Continued)

OTHER PUBLICATIONS

U.S. Appl. No. 09/054,864, filed Apr. 3, 1998, Frink et al.

(Continued)

*Primary Examiner*—Kieu-Oanh Bui
(74) *Attorney, Agent, or Firm*—Peter J. Gordon

(57) ABSTRACT

Command data may be embedded in the data transmitted over an interconnect between video devices to specify memory addresses in a destination device. Using an embedded address allows address-dependent data to be transmitted over the interconnect without losing these attributes. For example, compressed video may be transferred from a disk controller to a memory device using this interconnection protocol without losing address attributes of the bus architecture. The address information may be used either to read data from or to write data to a device over the interconnect into randomly-accessible memory locations.

6 Claims, 4 Drawing Sheets

U.S. PATENT DOCUMENTS 6,374,336 B1    4/2002    Peters et al. ................. 711/167
6,415,373 B1    7/2002    Peters et al. ................. 711/167

FOREIGN PATENT DOCUMENTS

EP        0 658 852 A2    6/1995    ........... G06F 13/42
EP        0 694 849 A1    1/1996    ........... G06F 13/42

OTHER PUBLICATIONS

U.S. Appl. No. 09/055,073, filed Apr. 3, 1998, Frink et al.
U.S. Appl. No. 09/545,360, filed Apr. 7, 2000, Frink et al.
U.S. Appl. No. 09/800,883, filed Mar. 7, 2001, Frink et al.

* cited by examiner

METHOD AND APPARATUS FOR ACCESSING VIDEO DATA IN MEMORY ACROSS FLOW-CONTROLLED INTERCONNECTS

FIELD OF THE INVENTION

The present invention is related to protocols for interconnecting data processing devices, particularly video processing devices.

BACKGROUND

Analog motion-video signals, such as those used in common television sets, video tape recorders and other analog video systems, are temporally continuous and synchronous signals requiring various elements in a video system to be synchronized in order to be used. In other words, analog motion video signals have a predetermined and fixed rate to which all of the elements in the video system are synchronized. Any element in the video system is designed with the assumption that there will be a constant rate for input and output of motion video information.

More recently, it has been possible to store digital motion video data in data files on a computer. There are several methods for playing back such motion video data. One method is called "pushing" or "streaming" of the motion video data. Streaming is based on an assumption that a system can provide an average data flow rate that is the same as the ultimate data flow rate needed to ensure temporally continuous output of analog motion video images to a viewer. Sufficient buffering is used to account for expected latencies in data transfer between elements. In some cases, both the temporal and spatial resolution of the motion video information may need to be reduced. Such systems typically are designed with the assumption that transfer of audio and video data from a source through several processing elements to its ultimate destination can neither be delayed nor stopped.

When a general purpose digital computer is used to process motion video information, a constant rate of flow of data generally cannot be maintained. There may be variations in data flow rates due to various latencies in the computer system due to, for example, disk or memory read latency, interrupts from other processing elements in the computer, etc. In addition, in some systems, such as editing systems, the ability to stop and restart playback is desirable. In order to overcome such problems, one method which has been used is to provide sufficient buffering in combination with an ability for data transfer to be stalled, such as shown in U.S. Pat. No. 5,045,940 (Peters, et al.) which is hereby incorporated by reference. These principles are used in a computer network as described in published European Patent Application No. 0674414A2. An extension of this combination to special effects processing is disclosed in PCT Publications WO94/24815 and WO95/26100 which are incorporated by reference. In this system, a data decompressor outputs data into a first buffer, from which it is transferred to a second buffer associated with a special effects processor. The first buffer indicates whether valid data is available. In addition, the special effects processor indicates to a controller associated with the decompressor whether it can receive data based on memory in the second buffer.

One drawback of these systems is that they use a significant amount of buffering to accommodate for delays in data transfer between elements. Such systems also are designed for use with a single predetermined format of media. Video processing devices also generally are interconnected in a manner such that a receiver of data presumes that the sender of video data is transmitting video data over the interconnect in a predetermined order. Video data also is presumed to be written into a memory of a receiving device by one sender in a sequential manner.

SUMMARY

Command data may be embedded in the data transmitted over an interconnect between video devices to specify memory addresses in a destination device. Using an embedded address allows address-dependent video data to be transmitted over the interconnect without losing these attributes. For example, compressed video may be transferred from a disk controller to a memory device using this interconnection protocol without losing address attributes of the bus architecture. The address information may be used either to read video data from or to write video data to a device over the interconnect into randomly-accessible memory locations.

Accordingly, in one aspect, an output interface for a sender of video data has an output for providing video data, and a valid data signal associated with the data indicating whether the associated data includes valid video data, and a valid command signal indicating whether the data includes command data. The command data includes a memory address at a receiver of the data. The output interface transfers data and asserts one of the valid data signal and the valid command signal to the receiver in response to a request signal received from the receiver.

In another aspect, an input interface for a receiver of video data has an input for receiving data, and a valid data signal associated with the data indicating whether the associated data includes valid video data, and a valid command signal indicating whether the data includes command data. The command data includes a memory address at the receiver. The input interface transfers video data received to the memory address specified in the command data in the memory of the receiver.

In another aspect, a device for receiving video data from another device includes a memory for storing the video data. An input interface having an input for receiving data, and a valid data signal indicating whether the data includes valid video data, and a valid command signal indicating whether the data includes command data. The command data includes a memory address in the device. The input interface stores video data received from the other device in the memory in the device at the memory address specified in the command data. An output interface has an output for providing a request signal. The other device transfers the video data to the device in response to the request signal.

In another aspect, a device for writing video data to a memory in another device has an output interface having an output for providing data, and a valid data signal associated with the data indicating whether the associated data is valid video data, and a valid command signal indicating whether the data includes command data. The command data includes a memory address in the memory in the other device, and has an input for receiving a request signal from the other device. The output interface transfers data to the other device in response to a request signal received from the other device.

In another aspect, a device for reading video data from a memory in another device includes an output interface having an output for providing data, and a valid data signal associated with the data indicating whether the associated data is valid video data, and a valid command signal indicating whether the data includes command data. The command data includes a memory address in the memory in the other device and has an input for receiving a request signal from the other device. The output interface transfers data to the other device in response to a request signal received from the other device. An input interface has an input for receiving data and a valid data signal associated with the data indicating whether the associated data is valid video data. In one embodiment, the device has a memory. The input of the input interface receives a valid command signal indicating whether the data includes command data. The command data includes a memory address in the memory of the device. The input interface transfers valid data received to the memory address specified in the command data in the memory of the device. In another embodiment, called queue-coupled memory access, the device has a queue of memory addresses sent in command data to the other device. The input of the input interface receives a valid command signal indicating whether the data includes command data. The command data includes a memory address in the memory of the other device. The input interface determines whether the memory address corresponds to a memory address in the queue.

In another aspect, a device for providing video data to another device has a memory for storing video data. An input interface has an input for receiving data, and a valid command signal indicating whether the data includes command data. The command data includes a memory address in the device. The input interface reads video data from the memory in the device using the memory address specified in the command data. An output interface has an output for providing data, and a valid data signal associated with the data indicating whether the associated data is valid video data. The output interface transfers the video data read from the memory to the other device in response to a request signal received from the other device. In one embodiment, the input of the input interface receives a valid data signal indicating whether the data includes valid video data. The input interface transfers valid data received to the memory address specified in the command data in the memory of the device. In another embodiment, the device includes a queue of memory addresses received in command data from the other device. The output of the output interface sends a valid command signal indicating whether the data includes command data. The command data includes a memory address in the memory of the device, wherein the input interface outputs a memory address from where the data was read.

It should be understood that other aspects of the invention include the processes performed by these interfaces and devices in order to control data flow between devices while permitting access to memory using addressed embedded in data transported over flow-controlled interconnects.

DETAILED DESCRIPTION

Figure 1:
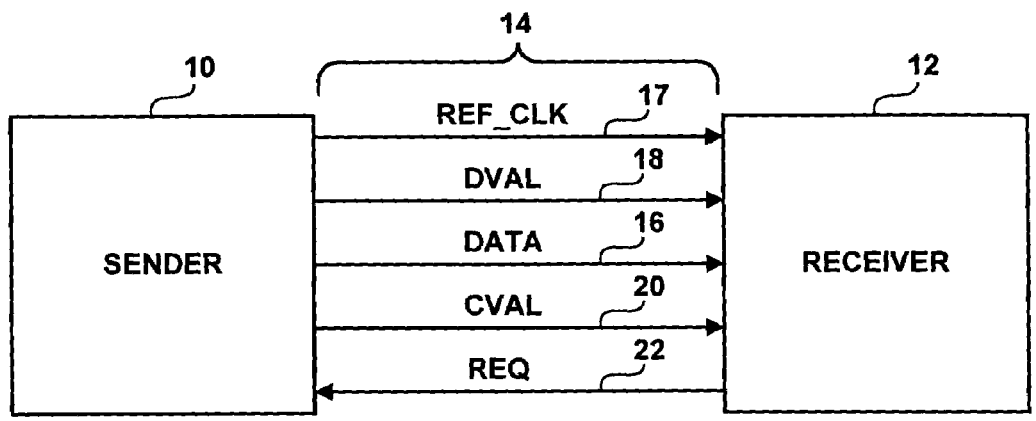
FIG. 1 is a block diagram of an interconnect between two video devices.

An interconnect for connecting two data processing devices is shown in FIG. 1. The diagram in FIG. 1 is general and illustrates the kind of data that is transferred between a sending device 10 and receiving device 12 over an interconnect 14. The kind of information includes data 16, a valid data signal (DVAL) 18, an optional valid command signal (CVAL) 20 and a request signal (REQ) 22. The sending device also may transmit a reference clock (REF_CLK) 17 to the receiving device. The data may be data to be processed or command data and also may include a boundary signal which is a delimiter of the data being transferred, such as the end of an image for video data. Various implementations for the interconnect 14 and a protocol for controlling data flow over the interconnect are described in the following U.S. patent application Ser. No. 08/879,981, entitled "Apparatus and Method for Controlling Transfer of Data Between and Processing of Data by Interconnected Data Processing Elements, filed Jun. 20, 1997 by Jeffrey D. Kurtze et al., and in U.S. Patent Applications entitled "Apparatus and Method for Controlling Transfer of Data Between and Processing of Data by Interconnected Data Processing Elements," filed Apr. 3, 1998, by Craig R. Frink et al., and "A Packet Protocol for Encoding and Decoding Video Data and Data Flow Signals and Devices for Implementing the Packet Protocol," filed Apr. 3, 1998 by Craig R. Frink, et al., and entitled "Method and Apparatus for Controlling Data Flow Between Devices Connected by a Memory," filed Apr. 3, 1998 by Craig R. Frink, which are hereby incorporated by reference.

Using such an interconnect, data transmitted over the interconnect may include command data such as an address in the receiving device 12. The embedded address allows address-dependent data processing to be performed. For example, data, such as video data, may be transferred from storage, e.g., via a disk controller, to a destination device, such as a video processing board, over a PCI bus and through an interconnect shown in FIG. 1 without losing PCI attributes such as the address in the destination device and the length of the data. Because a sender may specify an address, data may be written into the memory at the receiving device 12 in any order.

Figure 2:
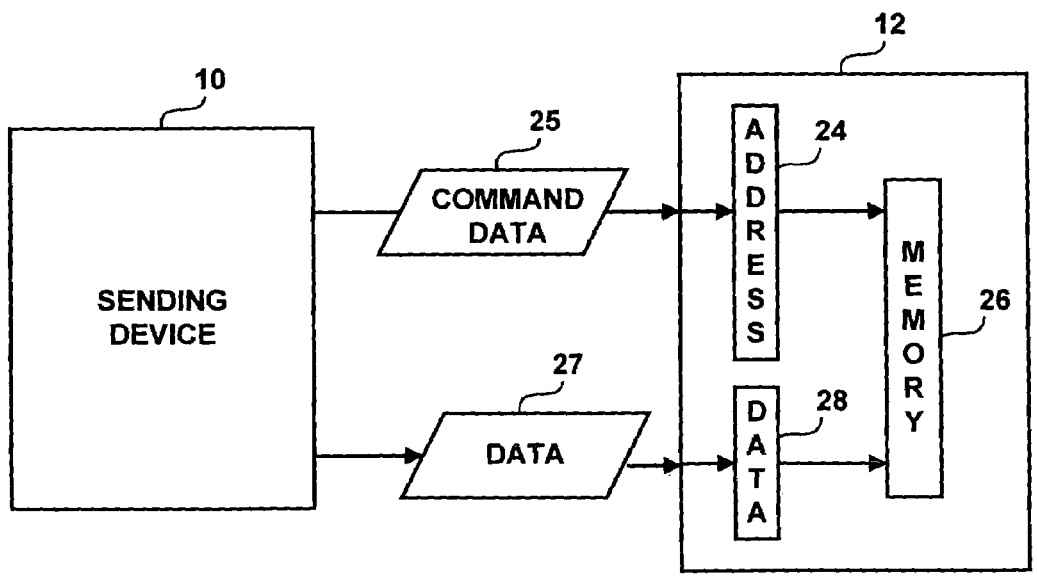
FIG. 2 is a block diagram illustrating writing of data to a receiving device wherein command data included in the information specifies a destination address in the memory of the receiving device.

Referring now to FIG. 2, the writing of data by the sending device 10 into memory of the receiving device 12 will now be described. The sending device 10 transmits data 27 and command data 25 to the receiver 12. The command data 25 may precede the data 27 when the command data is transmitted separately or serially with the data to which it corresponds. Alternatively, the command data 25 may be included in a data packet including the data 27 to be stored at the receiving device 12. Command data 25 also may be transmitted from the sending device 10 to the receiving device 12 through a channel or interconnect separate from the channel or interconnect through which the data 27 is transmitted. Command data may be distinguished from video data using the valid data signal and the valid command signal. The command data 25 is processed by the receiver 12 to determine an address which, as indicated at 24, is applied to the address inputs of the memory 26. The data 27 is written into the memory 26 at the address 24 specified by command data. If the memory 26 has sufficient capacity, different channels may be defined by allocating a segment of the memory for each channel. Alternatively, several channels may write to the same memory 26 to enable data to be combined in the memory.

Figure 3:
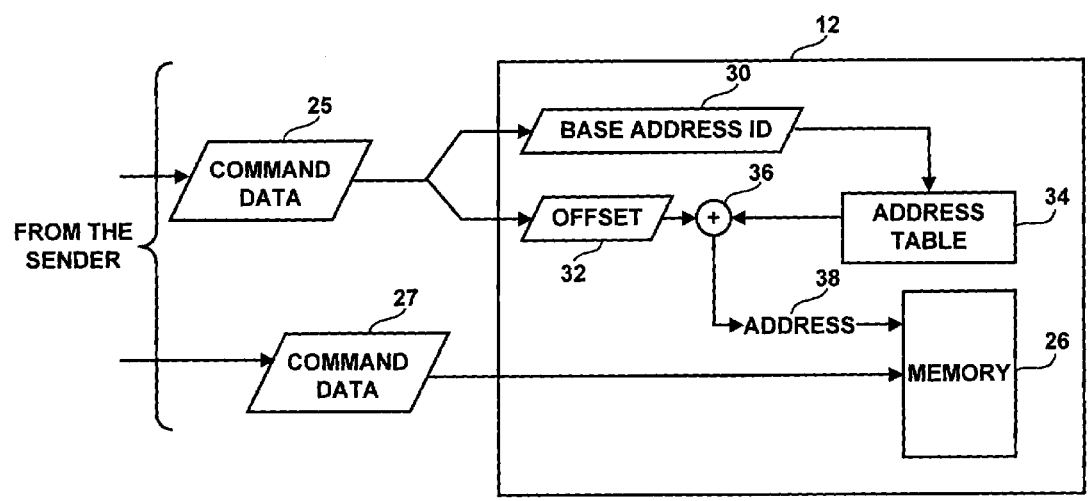
FIG. 3 is a block diagram illustrating reading of data from a remote memory device, wherein command data included in a request includes an address in the remote memory device.

A memory controller may have a base address to which the address in the command data is added as an offset. Referring now to FIG. 3, such an embodiment will now be described. A base address may be specified in many ways. For example, the command data may include a stream identifier which may be used as an index to a base memory address. Such a stream identifier may be provided in a packet conforming with a packet-based protocol, such as described in U.S. patent application entitled "A Packet Protocol for Encoding and Decoding Video Data and Data Flow Signals and Devices for Implementing the Packet Protocol,", filed Apr. 3, 1998 by Craig R. Frink and Andrew V. Hoar, which is hereby incorporated by reference. The identifier may be used to index a table of base addresses. In FIG. 3, the command data 22 includes a base address identifier as indicated at 30 and an offset indicated at 32. The base address identifier 30 is applied to an address table 34 which outputs a base address. The base address and the offset 32 are combined in an adder 36 to provide the data address 38 which is used to access the memory 26. This embodiment allows a single memory controller to transfer data packets received for different streams based on a stream identifier in the data.

In the foregoing embodiments, the sending device 10 may be a PCI device which uses a direct memory access (DMA) to transfer data over a PCI bus and through the interconnect 14 to a receiving device 12. In such an embodiment, the PCI attributes of the data, such as the address and length may be provided through the interconnect 14 to the device.

Figure 4:
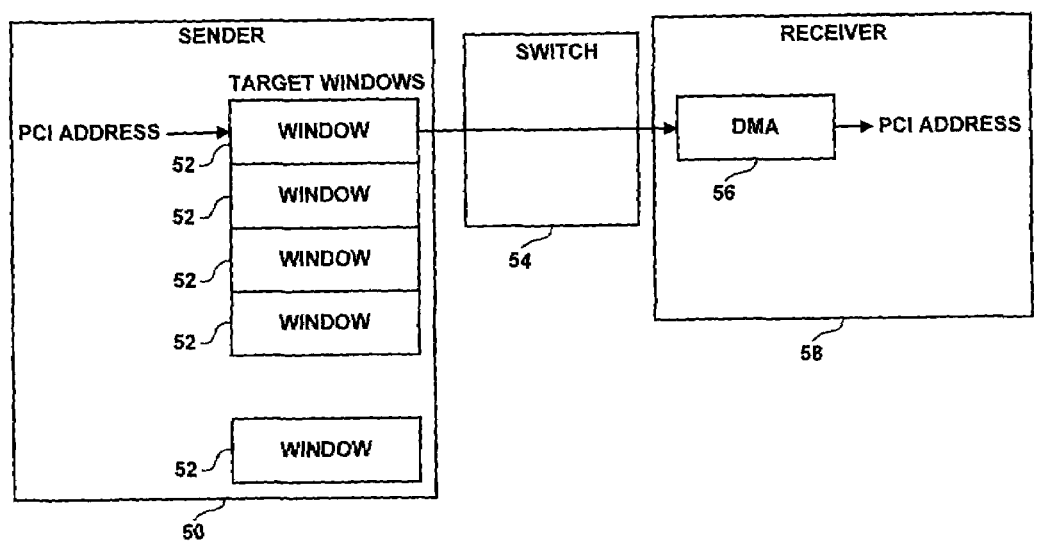
FIG. 4 is a block diagram illustrating the use of command data providing an address offset.

In another embodiment, rather than using direct memory access at a sending device, the data is written into a target address window in the sending device. FIG. 4 illustrates a sending device 50 with target address windows 52. A target address window associates an address range in the sender with an address range in the PCI address space and a stream identifier. The target address windows may support individual target address maps or may be combined to create a larger target address for a single sending device. The total address space of the target address windows may be programmable in size and divided among the windows. The number of windows is function of the number of target devices (receivers) and streams supported. In this embodiment, data written into a target address window is transferred from the target address window to the receiving device through the switch, with an address specified in the command data. In FIG. 4 data is transferred by the sender 50 to a receiving device 58 over a switch 54. A device initiating a transaction selects a receiver by address range, which selects a window in the sending device 50.

The target initiated data transaction is sent over the switch in the same way as a DMA initiated transaction and is received by a DMA engine 56 at the receiving device 58. The DMA engine 56 may use the embedded address in the data received over the switch, or may use a value programmed by the receiver to move the data packet to memory. The address sent from the sending device to the receiving device may be a direct address or an indirect address, i.e., an address offset, such as shown in FIGS. 2 and 3.

Figure 5:
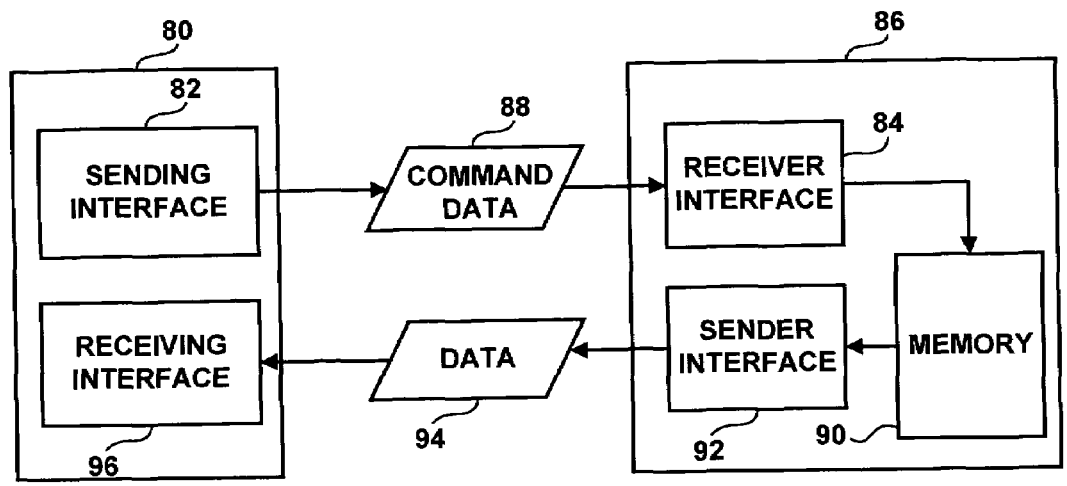
FIG. 5 is a block diagram illustrating the use of command data defining target address windows in a sending device address space.

It is also possible to read data from a remote memory device using this protocol, as now will be described in connection with FIG. 5. An address for accessing a memory in a device is transmitted over a data link to the device as command data. The device receives the command data and reads data from the memory at the address specified in the command data. The command data 88 is transferred over the data link to the sender 80. Sender 80 has a sending interface 82 through which data is sent to a receiver interface 84 in and receiver 86. This interconnect may be an interconnect such as shown in FIG. 1. This figure shows the command data 88 being transferred from the sender 80 to a receiver 86. The receiver interface 84 receives the command data and applies it to the address inputs of memory 90, which provides data to a sending interface 92 at the receiver 86. The sending interface returns data 94 to a receiving interface 96 in the sender 80. The interconnect for transporting data 94 may be an interconnect such as shown in FIG. 1.

Figure 6:
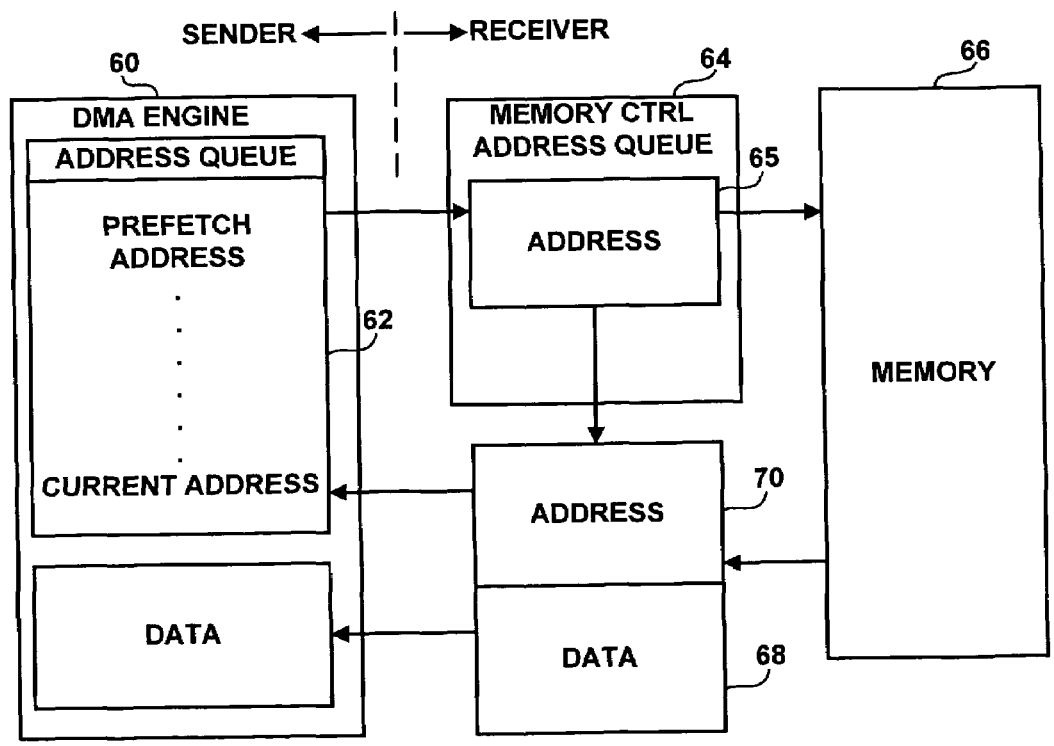
FIG. 6 is a block diagram illustrating an embodiment of a device with queue coupled direct memory access.

Referring now to FIG. 6, a queue coupled direct memory access device will now be described. In this embodiment, the sender has a DMA engine 60 with a DMA address queue 62. The queue tracks transactions that are issued to a remote memory, such as performed in the system of FIG. 5. The receiver may have a memory control address queue 64 which also receives addresses and stores them in a pipeline fashion. In response to a received address, as indicated at 65, the memory 66 is accessed to read data 68. The address 70 also is returned to the sender 60. The returned address 70 is compared to addresses the address queue 62 and the corresponding entry in the queue 62 is removed.

The queue coupled direct memory access is used when applications using the system use the data to indicate control transfer points. For example, an application may scan a video data stream for a marker code, such as may be found in JPEG-compressed or MPEG-compressed video data. When a marker code is found, a change in flow or DMA context may occur. When changes in flow occur, the DMA engine 60 tracks the address at the time the flow changes and may return to the original context.

In particular, the queue 62 includes a sequential list of transactions that the DMA 60 has sent to the memory, a current transaction pointer, and a pre-fetch pointer. The current transaction pointer indicates the address of the transaction that is currently in use and for which data is being received from memory. The pre-fetch pointer indicates the last pipeline transaction issued to memory 66. The transaction queue depth is a function of interconnect and memory latency. By queuing a number of transactions corresponding to the memory latency, the performance capable of being achieved by the pipeline is maximized.

The queue 62 advances its current transaction pointer when a new transaction returns from memory. This advancement allows the DMA to keep precise positional information regarding transactions while taking advantage of the fact that DMA transactions are pipelined. As an example, if the DMA engine is scanning for a marker code, it can stop at any component in the stream and then restart at the next component sometime later. Because the DMA knows its current transaction pointer, it is able to restart at this point. If the DMA context changes because of a data dependency, like a marker code in the data stream, pre-fetched transactions are flushed from the pipeline before new DMA context is used. This flushing operation may involve waiting until pre-fetched transactions return from memory, flushing the data FIFO, or, in systems with large memory transaction queues, sending a command packet to the memory to terminate an unfinished transaction for the device.

By using a queue of pipelined DMA addresses, contextual coherence may be maintained when multiple DMA transactions issue before data returns from memory and the returning data results in changes to the DMA context. The DMA with such a queue may issue memory transactions limited only to the depth of the memory pipeline and the depth of the address queue. Transactions may be issued in any sequence directed by the DMA context. The memory system tags the data for return with a value that is compared with the DMA address queue. The DMA compares the returning tag address with its queue of pre-fetched address pointers. When a data-dependency is detected in the data stream, the DMA stops processing at the current address and stores its context for future processing. Previously issued pipeline transactions following this context switch point may be discarded or retained for use when the DMA resumes processing of the context.

Using such a circuit, multiple independent data streams may be combined together into a single stream, or a data stream may be separated into multiple independent data streams. Such an embodiment described in more detail in U.S. patent application entitled "Video Data Storage and Transmission Formats and Apparatus and Methods for Processing Video Data in Such Formats," filed Apr. 3, 1998, by Craig R. Frink et al., which is hereby incorporated by reference.

Allowing a memory address to be conveyed along with video data enables the use of a memory that is remote from all devices to accumulate the video data in parallel rather than in series. The ability to convey a memory destination address over a video interconnect enables nonlinear data, such as command data, or data from a storage element or network to be commercial between various devices efficiently. Memory transactions may be pipelined using a queue to track addresses to which requests have been sent and for which data arrival is awaited. These benefits are provided in combination with the capability of transferring data with controlled flow or constant flow over the interconnect.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An output interface for a sender of video data, comprising:
   a first output for providing data,
   a second output for providing a valid data signal associated with the data output by the first output and indicating whether the output data includes valid video data,
   a third output for providing a valid command signal indicating whether the data output by the first output includes command data, and wherein the command data includes a memory address at a receiver,
   wherein the first, second and third outputs are in parallel; and
   wherein, in response to a request signal received from the receiver, the output interface transfers one of valid video data and command data and asserts one of the valid data signal and the valid command signal to the receiver.

2. An input interface for a receiver of video data, comprising:
   a first input for receiving data,
   a second input for receiving a valid data signal associated with the data received by the first input and indicating whether the received data includes valid video data,
   a third input for receiving a valid command signal indicating whether the data received by the first input includes command data, and wherein the command data includes a memory address at the receiver,
   wherein the first, second and third inputs are in parallel;
   wherein the input interface stores command data received by the first input in memory of the receiver; and
   wherein the input interface transfers video data received by the first input to the memory address specified in the command data in the memory of the receiver.

3. A device for sending video data to a memory in another device, comprising:
   an output interface, comprising a first output for providing data, a second output for providing a valid data signal associated with the data output by the first output and indicating whether the output data includes valid video data, a third output for providing a valid command signal indicating whether the data output by the first output includes command data, and wherein the command data includes a memory address in the memory in the other device, wherein the first, second and third outputs are in parallel, and an input for receiving a request signal from the other device; and
   wherein, in response to the request signal being received from the other device, the output interface transfers one of valid video data and command data to the other device and asserts one of the valid data signal and the valid command signal.

4. The device of claim 3, further comprising:
   a memory; and
   an input interface comprising a first input for receiving data, and a second input for receiving a valid data signal associated with the data received by the first input and indicating whether the received data includes valid video data, and a third input for receiving a valid command signal indicating whether the data received by the first input includes command data, wherein the command data includes a memory address in the memory of the device, wherein the first, second and third inputs are in parallel, wherein the input interface stores command data received by the first input in memory of the device, and wherein the input interface transfers valid video data received by the first input to the memory address specified in the command data in the memory of the device.

5. A device for receiving video data from another device, comprising:
   a memory for storing the video data;
   an input interface comprising a first input for receiving data, a second input for receiving a valid data signal indicating whether the data received by the first input includes valid video data, a third input for receiving a valid command signal indicating whether the data received by the first input includes command data, wherein the command data includes a memory address in the device, wherein the first, second and third inputs are in parallel, wherein the input interface stores command data received by the first input at the device, and wherein the input interface stores video data received by the first input from the other device in the memory in the device at the memory address specified in the command data stored at the device; and an output interface having an output for providing a request signal, wherein the other device transfers the video data to the device in response to the request signal.

6. The device of claim 5, further comprising:
an output interface comprising a first output for providing data, a second output for providing a valid data signal associated with the data output by the first output and indicating whether the output data includes valid video data, a third output for providing a valid command signal indicating whether the data output by the first output includes command data, and wherein the command data includes a memory address in the memory in a third device, wherein the first, second and third outputs are in parallel, and an input for receiving a request signal from the third device; and wherein, in response to the request signal being received from the third device, the output interface transfers one of valid video data and command data to the other device and asserts one of the valid data signal and the valid command signal.

* * * * *